United States Patent [19]

Shirai

[11] Patent Number: 5,014,118
[45] Date of Patent: May 7, 1991

[54] LUMINANCE SIGNAL PROCESSING CIRCUIT USING 3 LINE LOGICAL COMB FILTER

[75] Inventor: Mitsuzou Shirai, Osaka, Japan

[73] Assignee: Sanyo Electric Co., Ltd., Moriguchi, Japan

[21] Appl. No.: 545,750

[22] Filed: Jun. 29, 1990

[30] Foreign Application Priority Data

Jun. 30, 1989 [JP] Japan .................................. 1-170319

[51] Int. Cl.$^5$ .............................................. H04N 9/78
[52] U.S. Cl. ...................................................... 358/31
[58] Field of Search ...................... 358/31, 39, 310, 36

[56] References Cited

U.S. PATENT DOCUMENTS

| | | | |
|---|---|---|---|
| 4,050,084 | 9/1977 | Rossi | 358/31 |
| 4,524,382 | 6/1985 | Tanaka et al. | 358/31 |
| 4,862,252 | 8/1989 | Kuroda | 358/31 |
| 4,951,128 | 8/1990 | Miyake | 358/31 |
| 4,961,108 | 10/1990 | Perlman | 358/31 |

OTHER PUBLICATIONS

"Flicker-Free Non Interlaced Receiving System for Standard Color TV Signals", Okada et al., IEEE Transactions on Consumer Electronics, vol. CE-31, No. 3, Aug. 1985, pp. 240-254.

Primary Examiner—Tommy P. Chin
Attorney, Agent, or Firm—Armstrong, Nikaido, Marmelstein, Kubovcik & Murray

[57] ABSTRACT

A luminance signal processing circuit of a VCR functions as a non-correlation component enhancement circuit during recording, and as a line correlation noise reduction circuit during reproduction. The luminance signal processing circuit enhances the non-correlation components in the luminance signal utilizing a 1H delay circuit of the output side of a conventional 3 line logical comb filter which is used as a Y/C separating circuit, during recording. The luminance signal processing circuit removes the noise components in the reproduced luminance signal utilizing a 1H delay circuit of the input side of a conventional 3 line logical comb filter which is used as a noise reduction circuit for remaining color components, during reproduction.

7 Claims, 6 Drawing Sheets

LUMINANCE SIGNAL PROCESSING CIRCUIT USING 3 LINE LOGICAL COMB FILTER

BACKGROUND OF THE INVENTION

1. Field of the Invention

The invention relates to luminance signal processing circuits, and more particularly, to a luminance signal processing circuit using a 3 line logical comb filter in magnetic recording reproducing devices such as video cassette recorders (hereinafter referred to as VCR).

2. Description of the Background Art

A VCR has been proposed using a comb filter, operating as a Y/C separating filter during recording for separating an input video signal into a luminance signal Y and a chrominance signal C (Y/C separation), and operating as a noise reduction circuit during reproduction for removing the small noise components in the reproduced luminance signal.

As an example of a comb filter, the so-called 3 line logical comb filter is known, such as the one described in U.S. Pat. No. 4,524,382, in which the comb type chrominance signal passing characteristic is implemented by using the bandpass filter (BPF) of each line for separating the chrominance signal components of 3 lines from the video signals of 3 lines to be logically processed.

In greater detail, a color TV signal (hereinafter referred to as video signal) of the NTSC system has the spectrum of luminance signal components and the spectrum of chrominance signal components alternately interleaved as shown schematically in the frequency spectrum diagram of FIG. 1 to avoid beat disturbance on the screen. Generally, when there is no difference between adjacent upper and lower horizontal lines, that is, when there is line correlation, luminance signal components are concentrated in the vicinity of the spectrum of n times (n is integer) the horizontal frequency $f_H$ (solid lines $Y_1$), while chrominance signal components are concentrated in the vicinity of the spectrum of $(n+\frac{1}{2}) f_H$ around 3.58 MHz (broken lines C). That is to say, Y signal components and C signal components are mutually frequency interleaved by $(\frac{1}{2}) f_H$. On the contrary, when there is difference between adjacent upper and lower horizontal lines, that is, when there is no line correlation, frequency spectrum regions around non-correlation components $Y_2$ and $Y_3$ of the Y signal are generated respectively in the low frequency region and the high frequency region of the whole band of signal Y in a frequency interleaved relation with the frequency multiplied output $Y_1$ of the horizontal frequency (FIG. 1).

Figure 1:
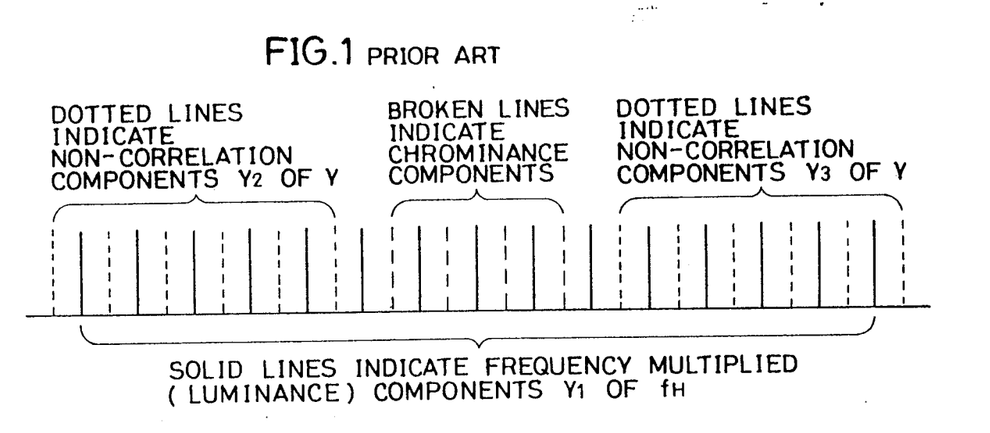
FIG. 1 is a diagram schematically showing the spectrum of the luminance signal component and the chrominance signal component.

For example, in a VCR recording mode, a filter having a comb type band-pass characteristic periodically repeated in accordance with the repetition of the spectrum shown in FIG. 1 is required to extract chrominance signal components from the input video signal having such a frequency spectrum.

The above mentioned 3 line logical comb filter is widely used as the comb filter.

Figure 2:
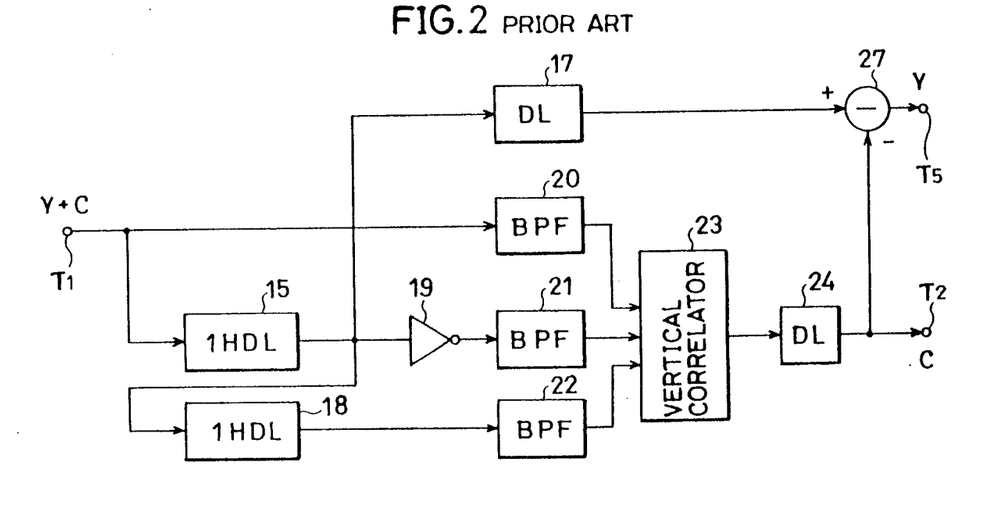
FIG. 2 is a block diagram showing an example of a 3 line logical comb filter.

FIG. 2 is a block diagram showing an example of such a 3 line logical comb filter. Referring to FIG. 2, video signal (Y+C) applied to an input terminal $T_1$ is provided to a BPF 20, as well as to a 1 H delay (1 HDL) circuit 15 to be delayed by 1 horizontal period. The output of 1 H delay circuit 15 is applied to a BPF 21 via an inverter 19, as well as to a delay circuit 17. The output from 1 H delay circuit 15 is also applied to a 1 H delay circuit 18, to be delayed by 1 horizontal period. The output of 1 H delay circuit 18 is applied to a BPF 22. Respective outputs of BPFs 20, 21, and 22 are applied to a vertical correlator 23, where the chrominance signal components C are extracted. Such a vertical correlator may be called as a vertical logical filter. Since the structure and operation of this vertical correlator 23 is disclosed in the aforementioned U.S. Pat. No. 4,524,382 and is well known, the description will be omitted here.

The chrominance signal C which is an output of vertical correlator 23 is applied to an output terminal $T_2$ as well as to the negative input of a subtraction circuit 27 through a delay circuit 24. The delay circuit 24 fine-adjusts the delay time of the output of vertical correlator 23 for the purpose of making the positive and negative inputs of subtraction circuit 27 be in phase. To the positive input of subtraction circuit 27, the output of 1 H delay circuit 15 is applied via delay circuit 17.

The subtraction circuit 27 subtracts the chrominance signal applied to the negative input from the video signal applied to the positive input. That is to say, subtraction circuit 27 subtracts the phase-inverted chrominance signal C from the 1 H delayed video signal (Y+C) of 1 H delay circuit 15, whereupon a luminance signal Y is provided via terminal $T_5$. The 3 line logical comb filter of FIG. 2 can be used as a noise reduction circuit for luminance signals during the reproduction by a VCR.

Using the aforementioned line correlation, a noise reduction circuit is proposed which suppresses the small noise components in the luminance signal generated during reproduction by the VCR. Such a noise reduction circuit functions so as to enhance the small signal components in advance that do not have line correlation during VCR recording, while removing the small signal that does not have line correlation as noise from the reproduced luminance signal during VCR reproduction.

Figure 3:
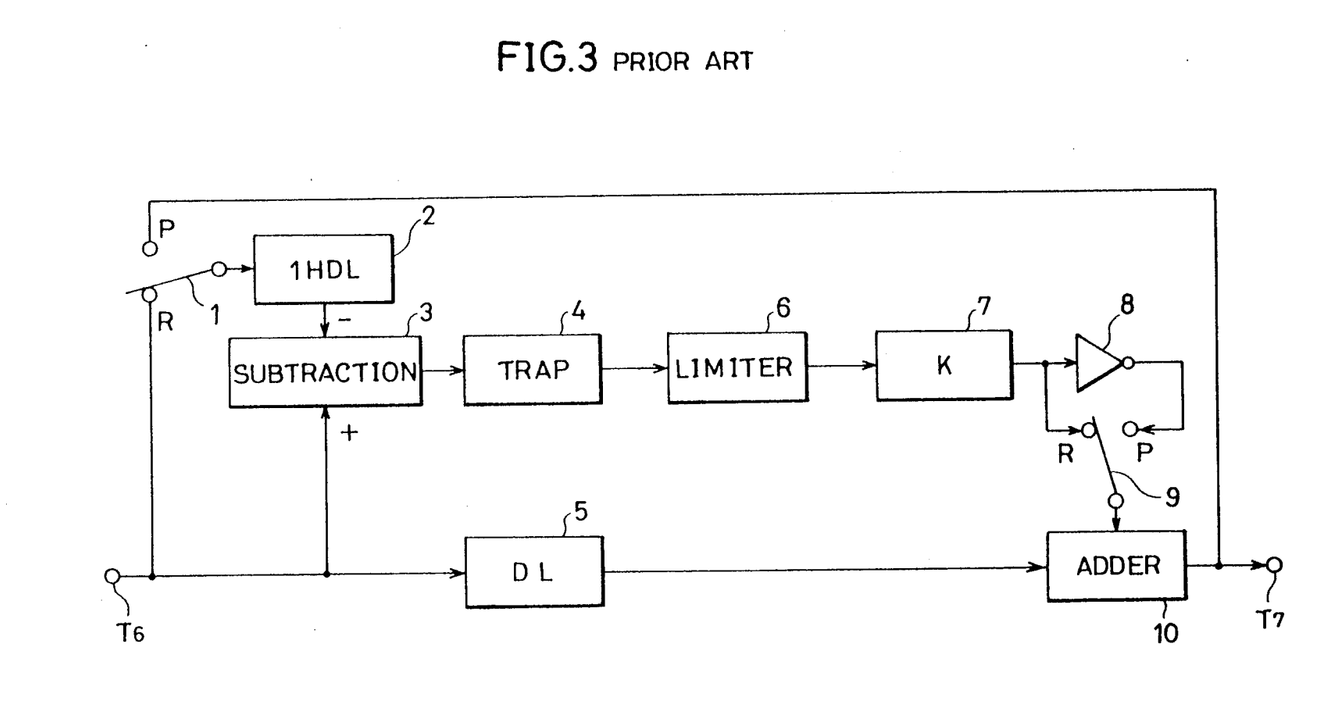
FIG. 3 is a block diagram showing an example of a conventional luminance signal processing circuit functioning as a non-correlation component enhancement circuit during recording and functioning as a line correlation noise reduction circuit during reproduction.

FIG. 3 is a block diagram of such a noise reduction circuit. During VCR recording, a luminance signal Y separated by the above mentioned 3 line logical comb filter serving as a Y/C separating filter is provided to a terminal $T_6$ to be applied to the positive input of a subtraction circuit 3 and a delay circuit 5, as well as to a 1 H delay circuit 2 via a switch 1 turned to the R side contact during recording. The 1 H delay circuit 2 provides the applied luminance signal Y to the negative input of subtraction circuit 3 after delaying the same by 1 horizontal period. The subtraction circuit 3 provides a difference signal by subtracting a delay signal of 1 H before from the current luminance signal, to a trap circuit 4. This difference signal corresponds to the difference components of the luminance signals between adjacent horizontal lines, that is, to the non-correlation components. The difference signal has the signal components of the chrominance signal band trapped at trap circuit 4, to be applied to a limiter 6, where the amplitude thereof is limited. As a result, the non-correlation small signal components are provided from limiter 6 to a K multiplication circuit 7 to be attenuated. The output of K multiplication circuit 7 is applied to one input of an addition circuit 10 via a switch 90 turned to the R side contact during recording. A luminance signal Y is applied to the other input of addition circuit 10 via the aforementioned delay circuit 5. This delay circuit 5 is provided for the purpose of making the timing of the two inputs of addition circuit 10 coincide with each other. The addition circuit 10 adds the non-correlation small signal components to the luminance signal Y. This output is provided through terminal $T_7$.

Thus, switch 1 switches so as to select the luminance signal as the input of 1 H delay circuit 2 to carry out an open loop addition processing during VCR recording. As a result, the non-correlation small signal components in the luminance signal will be enhanced in advance.

During VCR reproduction, switch 1 is turned to the P side contact, whereupon the output of addition circuit 10 is fed back to 1 H delay circuit 2. Via subtraction circuit 3, trap circuit 4, limiter 6, and K multiplication circuit 7, non-correlation small signal components are inverted by an inverter 8, to be applied to one input of addition circuit 10 as the small noise components via a switch 9 turned to the P side contact during reproduction. As a result, addition circuit 10 removes the small noise components from the reproduced luminance signal to be provided from terminal $T_7$. Thus, during VCR reproduction, switch 1 is switched so as to select the output of addition circuit 10 for carrying out the closed loop line correlation noise cancel operation.

In the 3 line logical comb filter of FIG. 2, two 1H delay circuits are necessary, while the luminance signal processing circuit of FIG. 3 functioning as a non-correlation component enhancement circuit during recording and a line correlation noise reduction circuit during reproduction requires one 1 H delay circuit. It is possible to simplify the structure of the circuit by sharing the 1 H delay circuits in the luminance signal processing circuit of FIG. 3 as one of the 1 H delay circuit of the 3 line logical comb filter of FIG. 2 and reduce the number of components in the circuit.

However, it is difficult to form the aforementioned non-correlation component enhancement circuit in the preceding stage of the 3 line logical comb filter because the 3 line logical comb filter functions as a Y/C separating circuit during VCR recording. Furthermore, if a noise reduction circuit is implemented in the succeeding stage of the 3 line logical comb filter during VCR reproduction, the aforementioned closed loop can not be established. Therefore, the sharing of the 1 H delay circuit has a disadvantage that there are many limitations associated with the structure of the circuit.

SUMMARY OF THE INVENTION

In view of the foregoing, an object of the present invention is to simplify the structure of the VCR's luminance signal processing circuit.

Another object of the invention is to provide a luminance signal processing circuit functioning as a non-correlation component enhancement circuit during VCR recording and functioning as a line correlation noise reduction circuit during reproduction, configured by sharing the 1 H delay circuit of the conventional 3 line logical comb filter.

In summary, the present invention is formed by utilizing the 1 H delay circuit of the input side among 1 H delay circuits constituting the conventional 3 line logical comb filter used as the Y/C separating circuit and noise reduction circuit as the 1 H delay circuit of the line correlation noise reduction circuit during reproduction, and utilizing the 1 H delay circuit of the output side as the 1 H delay circuit of the non-correlation component enhancement circuit during recording, in a luminance signal processing circuit functioning as a non-correlation component enhancement circuit during recording, and functioning as a line correlation noise reduction circuit during reproduction.

The main advantage of the present invention is to enable the sharing of the 1 H delay circuit in a luminance signal processing circuit to simplify the structure of the circuit, by forming the luminance signal processing circuit so as to enhance the non-correlation components after the removal of the chrominance signal components by the 3 line logical comb filter during recording, and removing the non-correlation noise components before the chrominance signal removal by the 3 line logical comb filter during reproduction.

The foregoing and other objects, features, aspects and advantages of the present invention will become more apparent from the following detailed description of the present invention when taken in conjunction with the accompanying drawings.

DESCRIPTION OF THE PREFERRED EMBODIMENT

Figure 4:
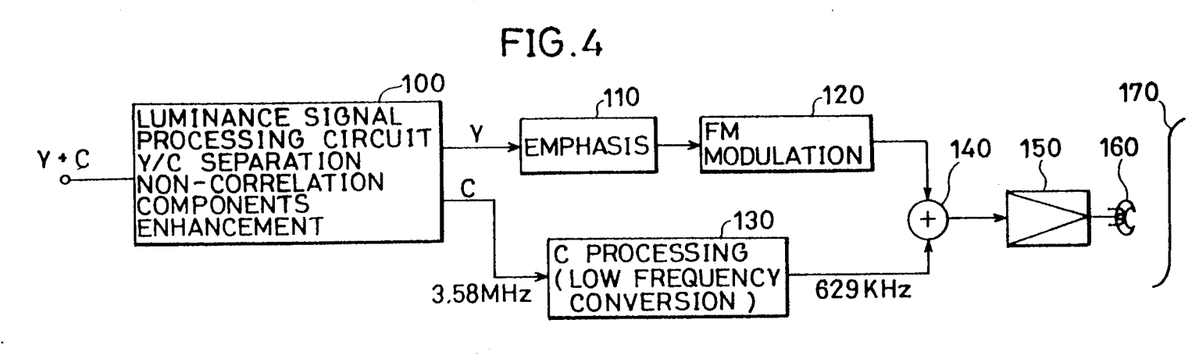
FIG. 4 is a block diagram schematically showing the circuit of the VCR's video signal recording system including the luminance signal processing circuit in accordance with an embodiment of the present invention.

FIG. 4 is a block diagram schematically showing the circuit of the VCR's video signal recording system including a luminance signal processing circuit in accordance with one embodiment of the present invention. Referring to FIG. 4, the input video signal (Y +C) provided from a signal source such as a tuner (not shown) is provided to a luminance signal processing circuit 100 performing Y/C separation and enhancement of the non-correlation components including the 3 line logical comb filter. The applied signal is separated into a Y signal and a C signal by the 3 line logical comb filter described in conjunction with FIG. 2, with the non-correlation components of the luminance signal components being enhanced.

The Y signal extracted from a luminance signal processing circuit 100 is applied to an emphasis circuit 110. Thus extracted Y signal is subjected to emphasis processing by emphasis circuit 110 and applied to a FM modulation circuit 120. The FM modulated signal is applied to one input of an addition circuit 140.

Meanwhile, the C signal extracted from luminance signal processing circuit 100 is converted to a low frequency range of 629 KHz from 3.58 MHz by a chrominance signal processing circuit 130 to be applied to the other input of addition circuit 140. The Y and C signals mixed at addition circuit 140 are amplified by an amplifier 150 and recorded on a magnetic tape 170 by a magnetic head 160.

Figure 5:
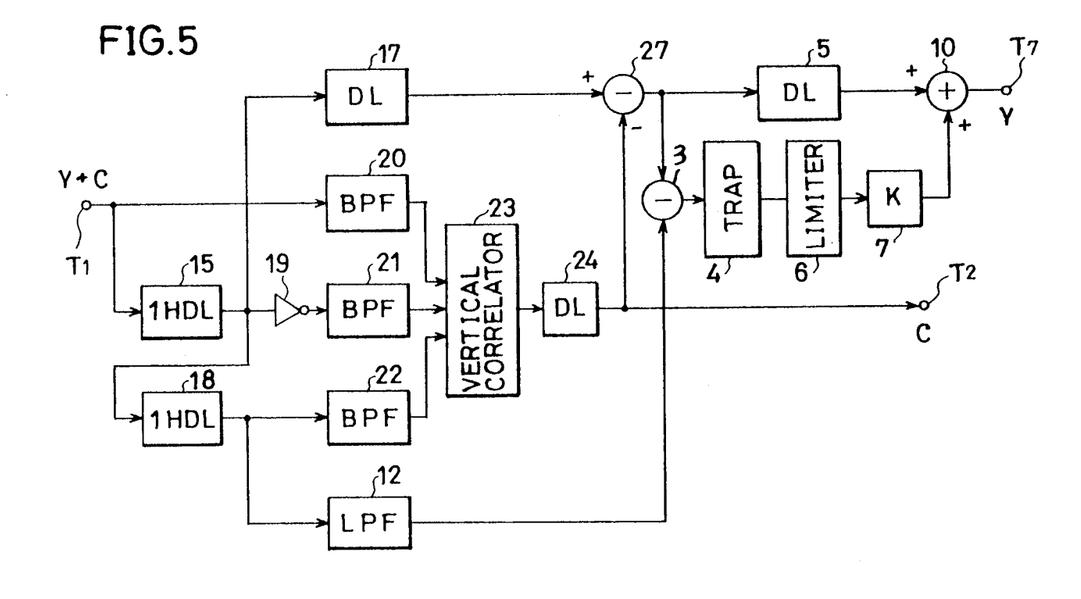
FIG. 5 is a block diagram showing the luminance signal processing circuit of FIG. 4.

FIG. 5 is a block diagram showing the luminance signal processing circuit 100 of FIG. 4. The circuit of FIG. 5 employs a 1 H delay circuit 18 of the 3 line logical comb filter of FIG. 2 to form an enhancement circuit of the non-correlation components. Therefore, the operation of the 3 line logical comb filter described in conjunction with FIG. 2 will not be repeated here.

The 2 H delayed signal provided from 1 H delay circuit 18 has the chrominance signal band components cut at a LPF 12 and applied to the negative input of subtraction circuit 3. The luminance signal Y provided from subtraction circuit 27 is applied to the positive input of subtraction circuit 3. The above mentioned 1 H delay circuit 18 corresponds to the 1 H delay circuit 2 of FIG. 3. The delay time of LPF 12 is set to be equal to the total delay time of delay circuit 17 and subtraction circuit 27. Accordingly, there is exactly 1 H of time difference between the two inputs of subtraction circuit 3.

The difference signal provided from subtraction circuit 3, i.e., the difference component of the luminance signal passes through trap circuit 4, limiter 6, and K multiplication circuit 7 in a similar manner of the circuit of FIG. 3 and is applied, as the non-correlation small signal components, to one input of addition circuit 10. This non-correlation small signal components are added to the luminance signal Y from subtraction circuit 27. Thus, from addition circuit 10, a luminance signal Y having the non-correlation small components enhanced is provided via terminal $T_7$.

In accordance with the embodiment of FIG. 5, the structure of the luminance signal processing circuit may be simplified by sharing the 1 H delay circuit 18 of the output side among 1 H delay circuits constituting the 3 line logical comb filter for Y/C separation in the enhancement of the non-correlation components, so that the non-correlation components may be enhanced after removing the chrominance signal with the 3 line logical comb filter.

Figure 6:
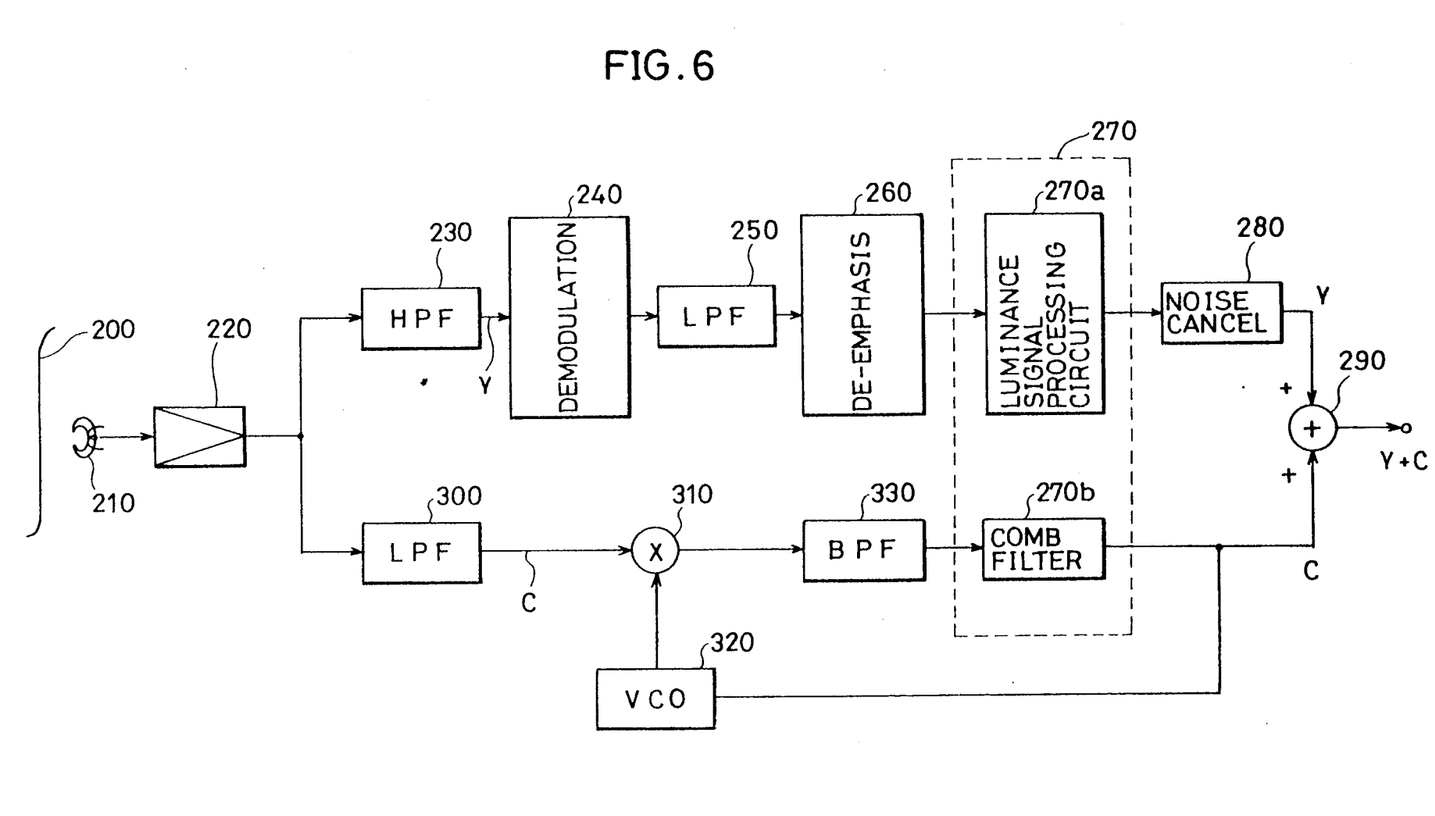
FIG. 6 is a block diagram schematically showing the circuit of the VCR's video signal reproduction system including the luminance signal processing circuit in accordance with one embodiment of the present invention.

FIG. 6 is a block diagram schematically showing the circuit of the VCR's video signal reproduction system including a luminance signal processing circuit in accordance with one embodiment of the invention. Referring to FIG. 6, a video signal recorded on a magnetic tape 200 is reproduced by a magnetic head 210 to be amplified by an amplifier 220. The luminance signal components Y of the output of amplifier 220 is extracted by a high pass filter (HPF) 230 to be FM demodulated by a FM demodulation circuit 240. The output of FM demodulation circuit 240 is applied to a de-emphasis circuit 260 via a low pass filter (LPF) 250 to be de-emphasized. The output of the de-emphasis circuit 260 is applied to a luminance signal processing circuit 270a forming a noise reduction circuit 270. The luminance signal processing circuit 270a suppresses the small noise components with respect to the Y signal and applies the output to a noise cancel circuit 280. The noise cancel circuit 280 is provided for the purpose of ensuring the required S/N ratio regarding the reproduced luminance signal from the magnetic head, and functions so as to diminish or cancel the high frequency range small signal of the input signal. One method for noise cancel is to extract the high frequency range small signal of the input signal by a HPF and a limiter and subtract it from the original signal. The Y signal having the noise components removed by noise cancel circuit 280 is applied to one input of an addition circuit 290.

Meanwhile, the chrominance signal components C of the output from amplifier 220 are extracted by a LPF 300 to be converted to a high frequency range by a high frequency range converting circuit 310 according to the output of an voltage controlled oscillator 320. The converted signal is applied to a 3 line logical comb filter 270b forming the noise reduction circuit 270 via a BPF 330. The C signal having the cross talk components removed by noise reduction circuit 270 is applied to the other input of an addition circuit 290, as well to VCO 320 to control the oscillating frequency of VCO 320. The reproduced video signal (Y+C) is provided from addition circuit 290.

Figure 7:
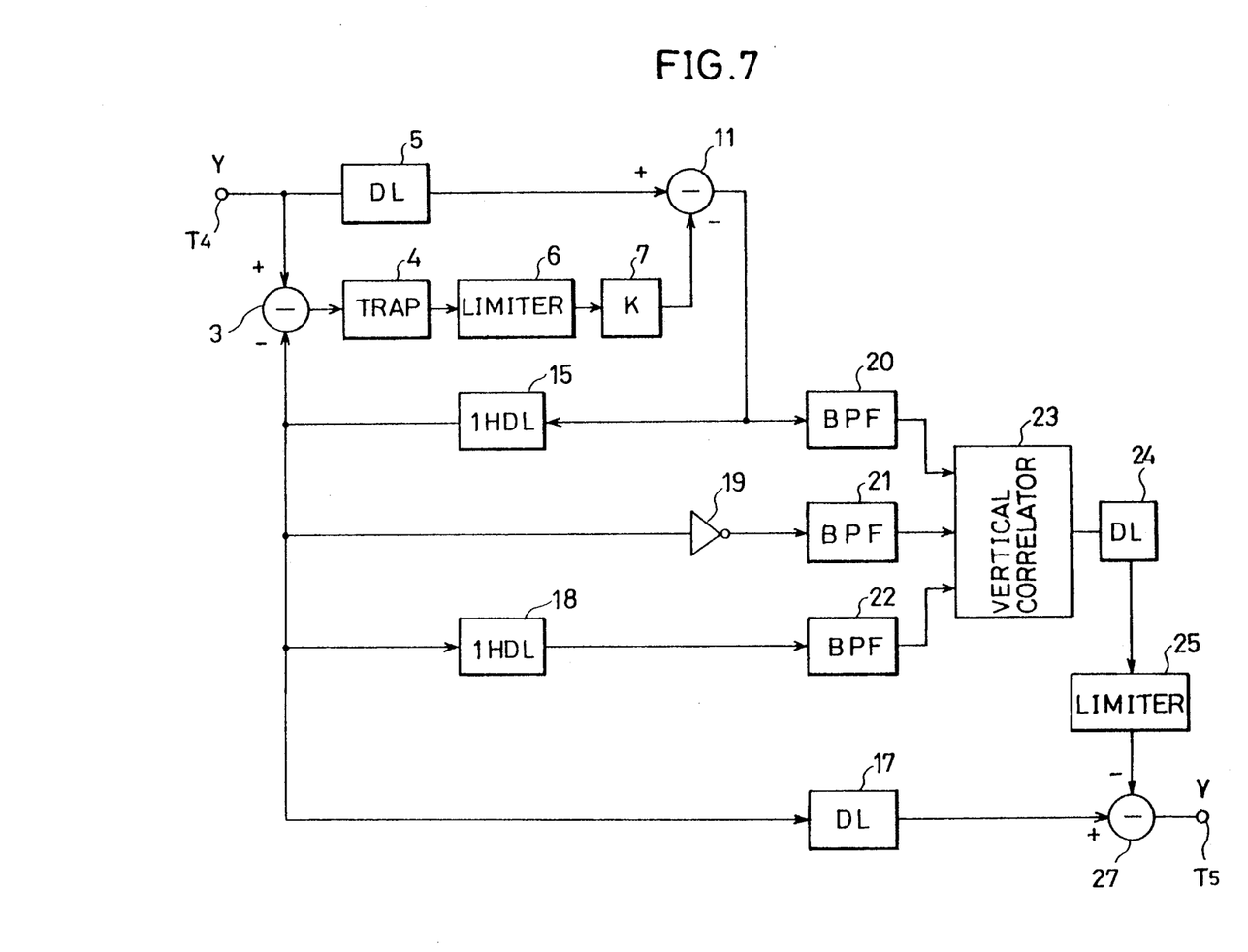
FIG. 7 is a block diagram showing the luminance signal processing circuit of FIG. 6.

FIG. 7 is a block diagram showing the luminance signal processing circuit 270a of FIG. 6. Since the circuit of FIG. 7 forms a non-correlation noise reduction circuit using the 1 H delay circuit 15 of the 3 line logical comb filter of FIG. 2, the operation of the 3 line logical comb filter described in conjunction with FIG. 2 will not be repeated here.

The reproduced luminance signal provided from terminal $T_4$ is provided to the positive input of subtraction circuit 3. The output of subtraction circuit 11 is fed back to the negative input of subtraction circuit 3 after being delayed by 1 horizontal period at 1 H delay circuit 15. The non-correlation small signal components obtained through subtraction circuit 3, trap circuit 4, limiter 6 and K multiplication circuit 7 are applied as the small noise components to the negative input of subtraction circuit 11, where the small noise components are removed from the reproduced luminance signal. This output is provided to BPF 20 and 1 H delay circuit 15 of the 3 line logical comb filter.

In accordance with the embodiment of FIG. 7, the structure of the luminance signal processing circuit is simplified by sharing the 1 H delay circuit 15 of the input side of the 3 line logical comb filter in the removal of the non-correlation noise components so as to remove the non-correlation noise components before removing the chrominance signal by the 3 line logical comb filter.

The VCR of the present invention may be configured so that the luminance signal processing circuit during recording shown in FIG. 5 and the luminance signal processing circuit during reproduction shown in FIG. 7 may share the same circuit.

Figure 8:
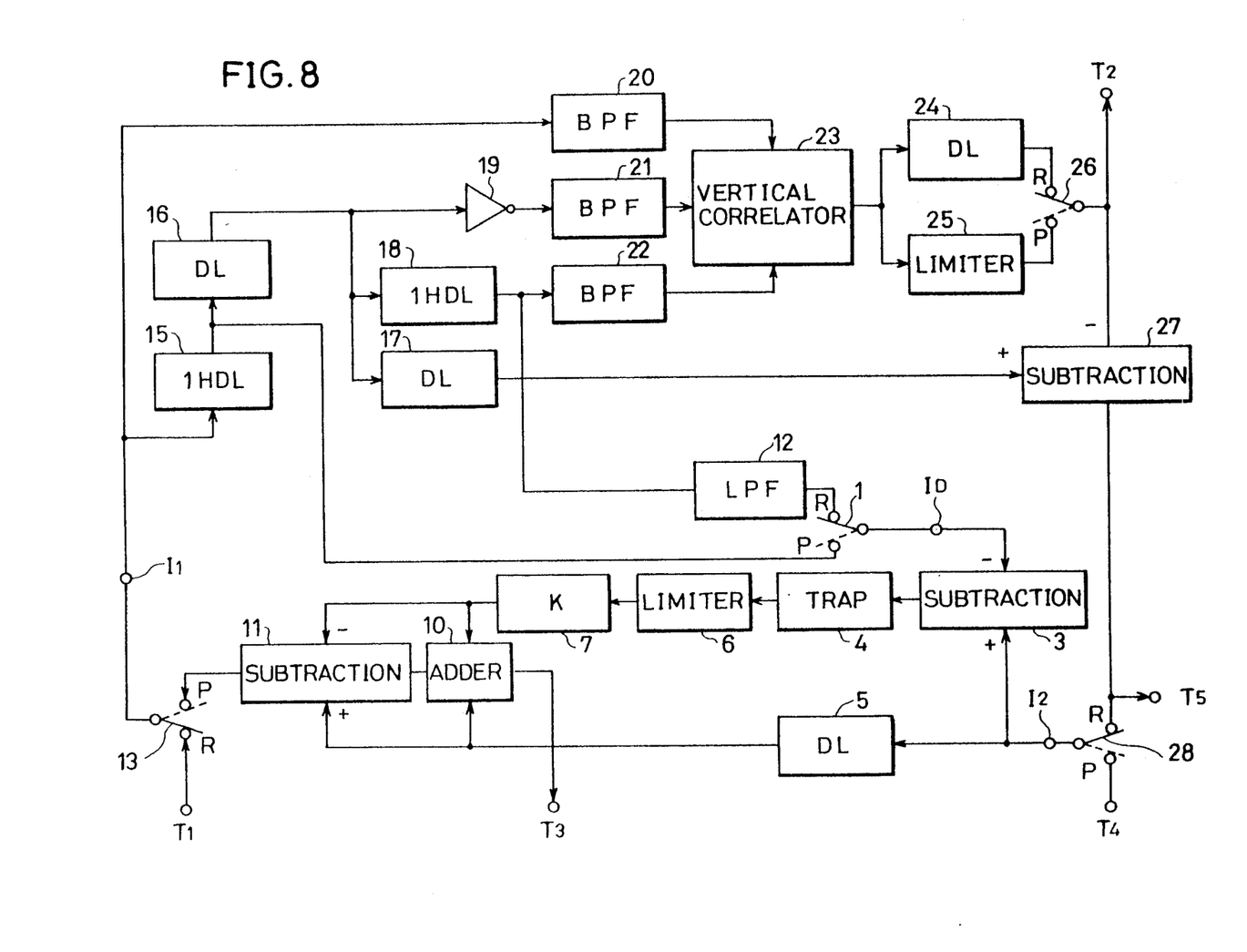
FIG. 8 is a block diagram showing the luminance signal processing circuit functioning as a non-correlation component enhancement circuit during recording and functioning as a line correlation noise reduction circuit during reproduction.

FIG. 8 shows such a luminance signal processing circuit that can be used as a non-correlation small component enhancement circuit during recording and as a line correlation noise reduction circuit during reproduction. Referring to FIG. 8, the operation during recording will be first described. The same references as those of FIG. 5 indicate the same elements.

During recording by the VCR, the circuit of FIG. 8 enhances the non-correlation components after the Y/C separation using the 3 line logical comb filter. In this case, the video signal (Y+C) is applied from terminal $T_1$ to the input terminal $I_1$ of the 3 line logical comb filter for Y/C separation via a switch 13 switched to the R side contact during recording.

The video signal provided to terminal $I_1$ is applied to BPF 20, as well as to 1 H delay circuit 15. The BPF 20 extracts only the chrominance signal components of the video signal and applies the same to vertical correlator 23. The input video signal is delayed by 1 H delay circuit 15 by approximately 1 H to be applied to a delay circuit 16.

Strictly speaking, the delay time of 1 H delay circuit 15 is set to be slightly shorter than 1 H so that the total delay time including that of delay circuit 16 will be a delay of exactly 1. The delay time circuit 16 is set to be equivalent to the processing time of the later described line correlation noise reduction circuit. The output of 1 H delay circuit 16 is applied to BPF 21 via inverter 19, as well as to 1 H delay circuit 18 and delay circuit 17. The BPF 21 extracts only the chrominance signal components within the 1 H delayed signal and applies the same to vertical correlator 23. The input 1H delayed signal is further delayed by 1 H delay circuit 18 by 1 H period to be applied to BPF 22 and also LPF 12. The BPF 22 extracts only the chrominance signal components within the 2 H delayed signal and applies the same to vertical correlator 23. The vertical correlator 23 provides a chrominance signal having no color blur with the comb type bandpass characteristic in response to the outputs of BPFs 20, 21, and 22.

The output of vertical correlator 23 passes through a delay circuit 24 and a switch 26 switched to the R side contact during recording to be outputted from to output terminal $T_2$ as the chrominance signal and to be applied to the negative input of subtraction circuit 27. The delay time of delay circuit 24 is set to be identical to the delay time of a later described limiter 25 and it is provided to make the timing of the two inputs of addition circuit 27 coincide. The delay circuit 17 delays the 1 H delayed signal from delay circuit 16 to be in timing with the above separated chrominance signal. This output is applied to the negative input of subtraction circuit 27, to provide a luminance signal having the comb type characteristic from terminal $T_5$.

The circuit of FIG. 8 not only forms the Y/C separating circuit, but also forms the non-correlation component detecting circuit utilizing the 1 H delay circuit 18 of the 3 line logical comb filter. The luminance signal provided from subtraction circuit 27 is applied to the input terminal $I_2$ of the non-correlation component enhancement circuit via a switch 28 switched to the R side contact during recording. The luminance signal provided to the input terminal $I_2$ is applied to one input of addition circuit 10 via delay circuit 5, as well as to the positive input of subtraction circuit 3. To the negative input of subtraction circuit 3, the 2 H delayed signal provided from 1 H delay circuit 18 is applied via LPF 12, switch 1 switched to the R side contact during recording, and a delay input terminal $I_D$. The LPF 12 provides a Y signal by cutting the chrominance signal component from the 2 H delayed signal. The delay time of LPF 12 is set to be equivalent to the total delay time of delay circuit 17 and subtraction circuit 27 to generate exactly 1 H time difference between the input terminal $I_2$ and the delay input terminal $I_D$. The subtraction circuit 3 subtracts the luminance signal applied from delay input terminal $I_D$ from the luminance signal applied from input terminal $I_2$ to generate a difference signal, i.e., difference components of the luminance signal. This difference signal has the chrominance signal band components trapped at trap circuit 4 and is amplitude-controlled by limiter 6. The non-correlation small signal components are provided from limiter 6 to be attenuated by K multiplication circuit 7 and applied to one input of addition circuit 10. The delay circuit 5 times the luminance signal from input terminal $I_2$ with the above mentioned non-correlation small components and applies the same to the other input of addition circuit 10. As a result, a luminance signal having the non-correlation small signal components enhanced is provided via terminal $T_3$ from addition circuit 10.

Also referring to FIG. 8, the operation of the VCR during reproduction will be described hereinafter. During reproduction by the VCR, the circuit of FIG. 8 removes the non-correlation small noise components prior to removing the remaining color components in the reproduced luminance signal utilizing the 3 line logical comb filter. In this case, the reproduced luminance signal Y is applied from terminal $T_4$ to the input terminal $I_2$ of the line correlation noise reduction circuit via switch 28 switched to the P side contact during reproduction.

The 1 H delayed signal provided from 1 H delay circuit 15 is applied to the delay input terminal $I_D$ via switch 1 turned to the P side contact during reproduction. The subtraction circuit 3 subtracts the 1 H delayed signal provided to the delay input terminal $I_D$ from the reproduced luminance signal applied to the input terminal $I_2$ to generate a difference signal. This difference signal is applied to trap circuit 4, where the chrominance signal band component in the applied difference signal is trapped and applied to limiter 6. The limiter 6 controls the amplitude of the output from trap circuit 4 and apply the output to K multiplicator circuit 7. The non-correlation small signal attenuated at K multiplication circuit 7 is applied to the negative input of a subtraction circuit 11 as the noise components.

Meanwhile, delay circuit 5 receiving the reproduced luminance signal from the input terminal $I_2$ provides the output thereof to the positive input of subtraction circuit 11 in timing with the output of K multiplication circuit 7. As a result, a reproduced luminance signal having the non-correlation noise components removed is provided from subtraction circuit 11 to the input terminal $I_1$ of the 3 line logical comb filter via switch 13 turned to the P side contact during reproduction. It is assumed that the delay time of each delay circuit is set so that the total delay time of 1 H delay circuit 15, delay circuit 5, and subtraction circuit 3 is exactly 1 H.

The reproduced luminance signal applied to the input terminal $I_1$ is provided to BPF 20, as well as to 1 H delay circuit 15. BPF 20 extracts only the chrominance signal components from the reproduced luminance signal and applies it to vertical correlator 23. The 1 H delay circuit 15 and delay circuit 16 delay the reproduced luminance signal by 1 H period and applies it to BPF 21 via inverter 19, as well as to 1 H delay circuit 18. BPF 21 extracts only the chrominance signal components of the 1 H delayed signal and applies it to vertical correlator 23. The 1 delay circuit 18 further delays the input 1 H delayed signal by 1 H period. This output is applied to BPF 22, where only the chrominance signal components of the 2 H delayed signal are extracted to be applied to vertical correlator 23.

The vertical correlator 23 generates noise components having a frequency identical to that of the chrominance signal components by logical processing in response to the outputs of BPFs 20, 21 and 22. The noise components are amplitude-controlled by limiter 25 to be applied to the negative input of subtraction circuit 27 via switch 26 turned to the P side contact during reproduction. To the positive input of subtraction circuit 27, a 1 H delayed signal is applied via delay circuit 27.

Thus, a reproduced luminance signal having the noise components such as cross color components and remaining color components removed is provided from subtraction circuit 27 to be outputted from terminal $T_5$ as the reproduced luminance signal. The negative output of subtraction circuit 11 of FIG. 8 corresponds to the inverter 8 and addition circuit 10 of FIG. 3.

The inverter 19 may be provided within vertical correlator 23. When the delay time of LPF 12 is too short, a delay circuit may be added to delay the signal applied to the delay input terminal $I_D$.

Also in the case of dropout compensation during reproduction, a dropout compensation switch may be added at the succeeding stage of input terminal $I_2$ that selects the output of the delay input terminal $I_D$ during the occurrence of dropout.

Meanwhile, high-pass filters (HPFs) can be substituted for the BPFs 20, 21 and 22.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A luminance signal processing circuit comprising:
   means ($T_1$) for providing a color video signal including a luminance signal and a chrominance signal during recording,
   means ($T_4$) for providing a reproduced luminance signal during reproduction,
   logical comb filter means, said logical comb filer means including
   a first input terminal ($I_1$),
   a first filter means (20) for extracting the signal components of the chrominance signal band from the input signal applied to said first input terminal,
   a first 1 H delay means (15) for delaying said input signal by 1 horizontal period,
   a second filter means (21) for extracting the signal components of the chrominance signal band from the output of said first 1 H delay means,
   a second 1 H delay means (18) for delaying the output of said first 1 H delay means by 1 horizontal period,
   a third filter means (22) for extracting the signal components of the chrominance signal band from the output of said second 1 H delay means,
   vertical correlator means (23) for providing the chrominance signal components having the comb type frequency characteristic by logically processing the outputs of said first, second, and third filter means, and
   a first subtraction means (27) for subtracting the output of said vertical correlator means from the output of said first 1 H delay means,
   signal processing means forming a non-correlation component enhancement circuit during recording, and a line correlation noise reduction circuit during reproduction, said signal processing means including
   a second input terminal ($I_2$),
   a delay input terminal ($I_D$),
   a second subtraction means (3) for subtracting the signal applied to said delay input terminal from the signal applied to said second input terminal,
   a first limiter means (6) for controlling the amplitude of the output of said second subtraction means, and operation means (10, 11) for adding the output of said first limiter means to the signal applied to said second input terminal during recording, and for subtracting the output of said first limiter means from the signal applied to said second input terminal during reproduction,
   a first switching means (13) switching so as to select said color video signal during recording and the subtraction output of said operation means (11) during reproduction, to apply to said first input terminal ($I_1$) of said logical comb filter means,
   a second switching means (28) switching so as to select the output of said first subtraction means (27) during recording and said reproduced luminance signal during reproduction, to apply said second input terminal ($I_2$) of said signal processing means,
   a third switching means (1) switching so as to select the output of said second 1 H delay means during recording and the output of said first 1 H delay means during reproduction, to apply to said delay input terminal ($I_D$) of said signal processing means,
   means ($T_2$) for providing the output of said vertical correlator means (23) as the chrominance signal during recording,
   means ($T_3$) for providing the addition output of said operation means (10) as the luminance signal during recording, and
   means ($T_5$) for providing the output of said first subtraction means (27) as the luminance signal during reproduction.

2. The luminance signal processing circuit according to claim 1, further comprising a second limiter means (25) for controlling the amplitude of the output of said vertical correlator means (23) to apply to said first subtraction means (27).

3. The luminance signal processing circuit according to claim 2, further comprising a first delay means (24) for delaying the output of said vertical correlator means (23) by the time equal to the delay time of said second limiter means during recording.

4. The luminance signal processing circuit according to claim 1, further comprising low pass filter means (12) for cutting the signal components of the chrominance signal band from the output of said second 1 H delay means (18) to apply to said second subtraction means (3).

5. The luminance signal processing circuit according to claim 1, wherein said signal processing means comprises
   trapping means (4) for trapping the signal components of the chrominance signal band from the output of said second subtraction means to apply to said first limiter means,
   attenuating means (7) for attenuating the output of said first limiter means to apply to said operation means, and
   a second delay means (5) for matching the timing of both inputs to said operation means.

6. The luminance signal processing circuit according to claim 1, further comprising a third delay means (17) for matching the timing of both inputs to said second subtraction means (27).

7. The luminance signal processing circuit according to claim 1, further comprising a fourth delay means (16) for delaying the output of said first 1 H delay means by a delay time equivalent to the signal processing time during reproduction and where the addition with the delay time of said first 1 H delay means (15) is exactly 1 horizontal period.

* * * * *